Feb. 27, 1962 G. R. PIPES 3,022,679
TORSIONAL VIBRATION DAMPENER
Filed Nov. 2, 1959 3 Sheets-Sheet 1
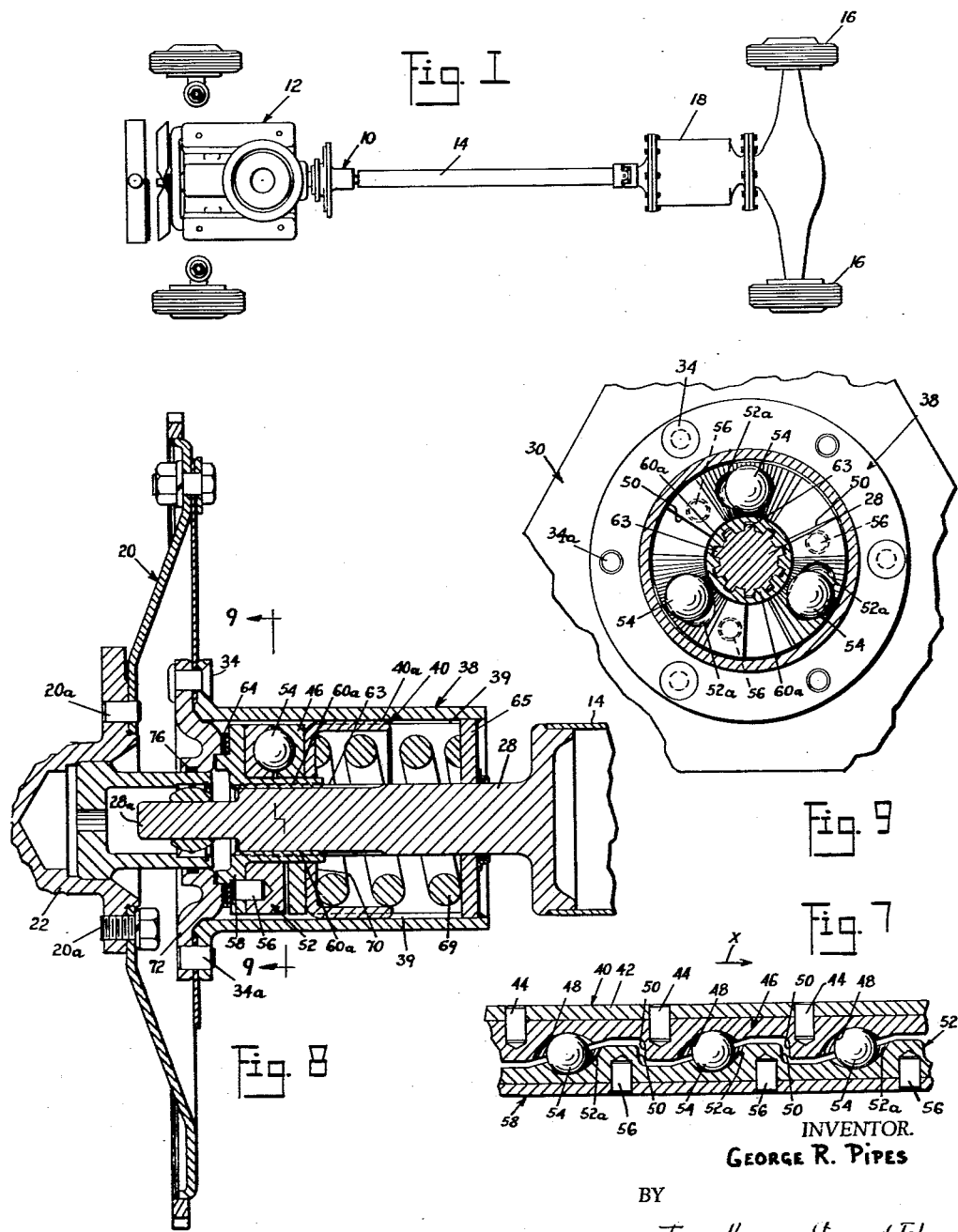
INVENTOR.
GEORGE R. PIPES
BY
Teare, Kramer, Sturges & Felzer
ATTORNEYS

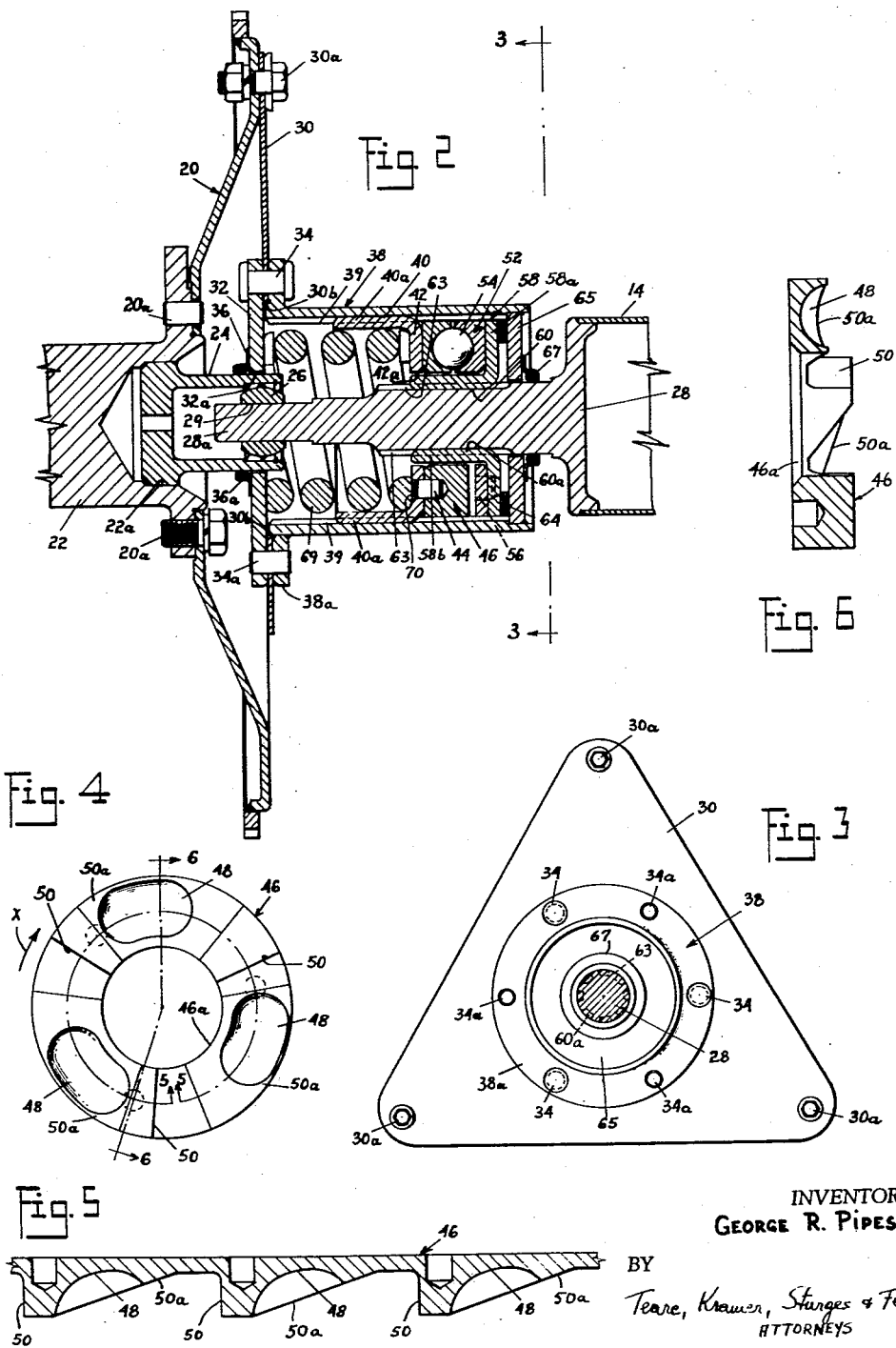

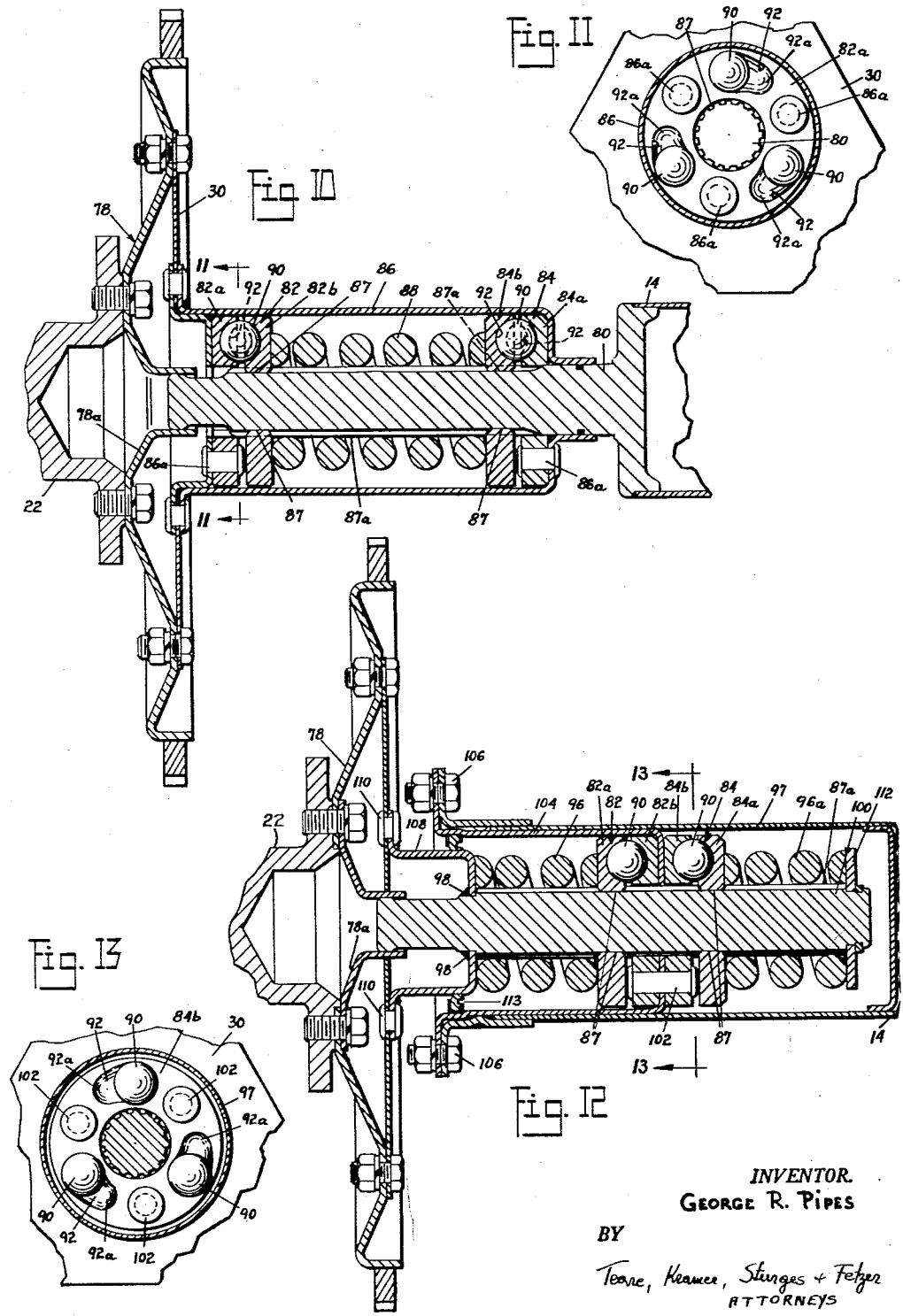

United States Patent Office  3,022,679
Patented Feb. 27, 1962

1

3,022,679
TORSIONAL VIBRATION DAMPENER
George R. Pipes, South Euclid, Ohio, assignor to Eaton
Manufacturing Company, Cleveland, Ohio, a corporation of Ohio
Filed Nov. 2, 1959, Ser. No. 850,422
13 Claims. (Cl. 74—574)

This invention relates to an automatic torsional vibration absorber or dampening device for alleviating torsional oscillations of a rotary shaft and the like. The invention is particularly useful in the automotive field and is illustrated and hereinafter described in connection with the latter, but it will be readily understood that it may also be used to advantage in other environmental settings.

The problem of reducing torsional vibrations in shafts is a well known one, and such torsional vibrations have always existed in the drive shaft of an automotive vehicle. Various arrangements are known in the art for alleviating such vibrations. However, such prior art arrangements have not been entirely satisfactory due in part to their either being unduly complicated, resulting in undue size, excessive initial cost and excessive maintenance, and thus have not been commercially feasible, or they have not operated effectively to prevent or materially reduce torsional vibrations.

The problem of alleviating such torsional vibrations in the drive shaft of an automotive vehicle becomes especially acute if the transmission assembly of the vehicle is moved from its normal forward position adjacent the rearward end of the crankshaft of the prime mover or motor of the vehicle to the rearward end of the vehicle adjacent the rear drive wheels, such an arrangement not having heretofore been generally utilized in domestic automotive vehicle production, but in recent years having been more frequently proposed for use therein.

The present invention provides a torsional vibration dampener which is of uncomplicated and relatively low cost construction, and which may be interposed between a driving member and a driven member or shaft, for materially alleviating or entirely preventing torsional oscillations of the rotatable shaft, and in a manner heretofore unknown in the art.

Broadly, the present invention provides a torsional vibration dampening device adapted for disposal between a driving member and a driven member and comprising a housing member and resilient means disposed in the housing member and coacting with relatively rotatable and relatively axially movable cam means, to transfer the rotary movement from the driving member to the driven shaft member for driving the latter, and in a manner whereby the resilient member and the cam means coact during actuation of the driving and driven members to alleviate or prevent torsional oscillations in the drive shaft or driven member.

Accordingly, an object of the invention is to provide an improved torsional vibration dampening device.

Another object of the invention is to provide an improved torsional vibration dampening device which utilizes an axially compressible resilient member in conjunction with cam means to transmit rotary movement from a rotatable driving member to a rotary shaft, for driving the latter, and wherein certain of the cam means is coupled to said driving member and other of the cam means is coupled to the shaft and with the cam means being movably coupled to one another by cam actuating ball means whereby the cam and ball means are movable relative to one another and operate to compress the resilient member upon actuation of said driving member and said shaft, to dampen torsional oscillations in the shaft.

A still further object of the invention is to provide a device of the latter mentioned type which is uncomplicated and economical in construction, and which is particularly well adapted for use in an automotive vehicle environment for dampening torsional vibrations in the drive shaft of a vehicle, and particularly in an automotive environment wherein the prime mover and the transmission and clutch mechanism for the vehicle are disposed at opposite ends thereof and connected to one another by means of a lengthwise extending drive shaft.

Other objects and advantages of the invention will be apparent from the following description taken in conjunction with the drawings wherein:

FIG. 1 is a top plan view of the torsional vibration dampening device embodied in an automotive environmental setting, and connecting the prime mover or motor of the vehicle to a rearwardly disposed clutch and transmission mechanism disposed at the rearward end of the vehicle.

FIG. 2 is an enlarged, side elevational, sectional view through the torsional vibration dampening device and as connected at its forward end to the crank shaft of the prime mover and at the other end thereof to a drive shaft, to drivingly couple the latter to the prime mover.

FIG. 3 is a reduced size, cross sectional view taken substantially along the plane of line 3—3 of FIG. 2, looking in the direction of the arrows, and with certain parts of the FIG. 2 arrangement having been eliminated in the interests of simplicity.

FIG. 4 is a face view of one of the cam members of the dampening device.

FIG. 5 is a developed sectional view of the cam member of FIG. 4 taken substantially along the line 5—5 thereof.

FIG. 6 is a vertical sectional view taken substantially along the line 6—6 of FIG. 4 looking in the direction of the arrows.

FIG. 7 is a developed sectional view similar to that of FIG. 5, but illustrating both cam members and the associated ball members coacting therebetween to couple the cam members together in relative rotatable and axially movable relation.

FIG. 8 is an enlarged, sectional, elevational view generally similar to FIG. 2 but illustrating a modified form of the invention.

FIG. 9 is a partially broken, vertical sectional view taken substantially along the plane of line 9—9 of FIG. 8, looking in the direction of the arrows.

FIG. 10 is a view generally similar to FIGS. 2 and 8 but showing a further modification of the invention.

FIG. 11 is a partially broken, vertical sectional view taken substantially along the plane of line 11—11 of FIG. 10 looking in the direction of the arrows.

FIG. 12 is a sectional elevational view similar to FIGS. 2, 8 and 10, but showing a still further modification of the invention.

FIG. 13 is a partially broken, vertical sectional view taken substantially along the plane of line 13—13 of FIG. 12, looking in the direction of the arrows.

Referring now again to the drawings and in particular to FIG. 1 thereof, there is illustrated an automotive environment in which the instant vibration dampening device is particularly well adapted for use. The dampening device 10 is disposed intermediate the engine or prime mover 12 of the vehicle and the drive shaft or load member 14, and is operatively connected thereto for transmitting the rotary motion of the crankshaft of the engine to the drive shaft, and thence to the rear driving wheels 16. The arrangement illustrated is that wherein the transmission and clutch mechanism 18 is disposed at the rear end of the vehicle in the vicinity of the rear drive wheels, and is connected to the engine at the front end of the vehicle by the drive shaft 14, and as aforementioned represents a structural organization wherein the torsional oscillations of the drive shaft are particularly pronounced.

Referring now to FIG. 2 for a detailed showing of the vibration dampening device, a conventional type flywheel and ring gear assembly 20 is shown connected as at 20a to the rearward end of the crankshaft 22 of the prime mover or engine 12. Thus, crankshaft 22 represents the driving member of the automotive assembly illustrated.

A crankshaft adapter member 24 is mounted in counterbored portion 22a of the crankshaft, and supports at its rearward end an adjustable shaft centering assembly 26 of conventional well known type. A stub shaft member 28 with a reduced diameter front end portion 28a extends through a central opening 29 in the centering assembly 26, and is supported in bearing relation therein. Stub shaft 28 at its rear end is connected to the drive shaft proper 14 by any suitable means, such as welding.

In accordance with the invention a triangular shaped, in the embodiment illustrated, relatively flexible plate member 30 is secured as by means of fastener assemblies 30a, to the flywheel and ring gear assembly 20. Plate 30 has a centrally disposed opening 30b therethrough, and a front plate or washer member 32 having an opening 32a therethrough is secured to the inner face of the flexible plate 30, as by means of rivets 34 and dowel pins 34a. An O-ring retainer element 36 circumscribes opening 32a in washer plate 32 and an O-ring 36a is disposed therein, such O-ring coacting in sealing relation with the crankshaft adapter member 24 extending rearwardly through opening 32a to retain lubricant disposed in housing member 38. The resilient torque transmitting plate 30 in conjunction with the universal pilot or centering assembly 26 provides a novel structural arrangement for accommodating a certain amount of initial misalignment of the transmission with respect to the prime mover, to thereby provide a more commercially feasible arrangement.

A drive hub or tubular housing member 38 having a peripheral flange portion 38a at its forward end, is also secured to flexible plate 30 in coaxial relation with the opening 30b therethrough and as by means of the aforementioned rivets 34 and dowel pins 34a. It will be seen, therefore, that the drive hub 38 is positively secured to the driving member or crankshaft 22 for rotation therewith. Hub member 38 has internal, longitudinally or lengthwise extending splines 39 therein for a purpose to be hereinafter described. In FIG. 2 of the drawings only two of such splines have been illustrated in the interests of simplicity of the drawings, but preferably the entire internal periphery of the hub member 38 is so splined and for substantially its full lengthwise extent.

A cam driver member 40 of cup-like configuration is disposed in the interior of hub 38 and is splined as at 40a lengthwise of member 40, for coaction with splines 39 of the hub member, to thereby rotate with hub 38 while permitting lengthwise movement of the cam driver member 40 relative to hub 38.

The rear wall 42 of driver member 40 is centrally apertured, as at 42a, for receiving therethrough the stub shaft 28. Member 40 is secured as by means of dowel pins 44 to forward cam member 46 (FIGS. 2, 4, 5, 6 and 7). Cam member 46 is centrally apertured as at 46a for receiving the stub shaft 28 therethrough, and has elongated and generally dished-shaped cam slots 48 disposed in the rearward face thereof. As can be best seen from FIGS. 4, 5 and 7, the rearward face of cam member 46 is of more or less toothed or waved configuration in cross section with the serrated-like configuration extending circumferentially or circularly about member 46, and with the axially extending generally planar surfaces 50 thereon providing abutments or stops for a purpose to be hereinafter described, and with each of the cam slots 48 being disposed in a respective one of the obliquely disposed surfaces 50a of the waved or toothed configuration. Mounted in more or less meshing relation with front cam member 46 is a rear cam member 52, the front face of which is generally of a similar and complementary configuration to the rear face of front cam member 46. In other words, the front face of rear cam member 52 is of more or less toothed or waved configuration, the same as the rear face of the front cam member, and embodies forwardly facing generally elongated dished cam slots or recesses 52a disposed in generally confronting but slightly offset relation to the slots 48 in front cam member 46 and as can be seen in FIG. 7 of the drawings. Movably disposed in each pair of confronting slots 48, 52a, is a ball member 54, such as a ball bearing element.

Cam 52 is secured as by means of dowel pins 56 to a cam follower retainer member 58 which comprises a circular base or flange portion 58a and a lengthwise extending centrally disposed head portion 58b. Member 58 is centrally apertured as at 60 and receives therethrough shaft 28. The interior surface of aperture 60 is provided with a plurality of lengthwise extending interior splines 60a which coact with exterior splines 63 on shaft 28 to thereby couple cam 52 and attached cam follower 58 to the shaft for rotation therewith while permitting lengthwise or axial movement of coupled elements 52 and 58 with respect to the shaft. A thrust bearing 64 is disposed intermediate flange 58a and apertured back plate 65 of housing 38, with such back plate 65 being provided with an O-ring and O-ring retainer assembly 67 coacting in sealing relation with shaft 28. A compression spring member 69 is disposed intermediate front plate or washer 32 and seat 70 on drive member 40, and urges member 40 and attached cam 46 against balls 54, and the latter to inactive position between cams 46 and 52, as best illustrated in FIG. 7 of the drawings.

Operation of the mechanism is preferably as follows: When the engine 12 is at rest, the spring 69 is expanded its maximum amount and urges the front cam member 46 rearwardly against balls 54 whereby the latter find their positions of equilibrium in their respective confronting cam slots 48, 52a, and as shown in FIG. 7 of the drawings. However, when the engine is actuated and is turning the crank shaft 22 in a clockwise direction for forward driving of the vehicle, power is transmitted to flywheel and ring gear assembly 20; thence to housing 38, thereby rotating the latter. Clockwise rotation of housing 38 causes corresponding clockwise rotation of cam driver member 40 and associated front cam member 46 and in the direction of the arrows X in FIGS. 4 and 7, due to the coacting splines 39, 40a on housing 38 and cam driver member 40, respectively. Cam member 46 then moves or tends to rotate relative to cam 52 with the balls 54 rolling somewhat in their respective confronting cam slots 48, 52a, such movement of the balls causing cam member 46 to be moved axially forwardly against the resistance to compression of spring member 69. Compression of spring 69 together with the associated rolling movement of balls 54 in their respective cam slots will continue until the resistance to compression for further axial movement of cam 46 and attached driver member 40 is greater than the resistance to rotation of stub shaft 28, at which time such shaft 28 will rotate, the power from engine 12 being transmitted through balls 54 to rear cam 52, cam follower retainer member 58, coacting splines 60a and 63, and thus to the stub shaft 28 and thence to the main drive shaft 14. It will be seen that the oblique or forwardly tilted position of the cam slots with respect to a transverse plane perpendicular to the rotary axis of shaft 28 rapidly increases the rate of compression of spring 69 upon relative rotary movement of front cam 46 with respect to rear cam 52, thereby rapidly increasing the resistance to forward axial movement of cam 46 away from the rear cam 52. The resistance to compression of spring 69 is such so as to cause alteration of the natural frequency of the drive system so that in the normal operating range of the overall system, the natural frequency or harmonics thereof are not encountered, thereby preventing torsional vibrations in the drive shaft.

Upon driving of the crank shaft 22 in the opposite or counter-clockwise direction for reverse or rearward motion of the vehicle, the dampening device operates in a generally similar manner as aforediscussed for forward driving of the vehicle except that aforementioned abutments 50 are provided to prevent overrunning of the balls 54 out of the confronting cam slots 48, 52a, after a predetermined relative rotary and axial movement between the cams 46 and 52. When such abutments 50 engage one another on the rearward and forward faces of the cams 46, 52 respectively, such cams operate as a solid member transmitting the power directly from the engine 12 to the stub shaft 28 and thence to the drive shaft 14.

Referring now to FIGS. 8 and 9, there is shown a modified form of the invention, such modified form being generally identical to the first described embodiment except that the cam and ball assembly and associated cam driver and follower elements 40 and 58 have been reversed and positioned adjacent the forward end of the housing 38, and the spring member 69 is disposed in the rearward portion of the housing, and coacts between seat 70 on the driver member 40 and rear wall 65 of the housing to urge cam member 46 axially forward against balls 54 and thence against cam 52. It will also be seen that the front wall or plate member 72 in this embodiment is of a slightly different configuration as compared to the front wall 32 of the first described embodiment, and utilizes a different arrangement of O-ring and retainer structure for sealing lubricant contained interiorly of the dampening device.

Referring now to FIGS. 10 and 11 of the drawings, there is shown a further modification of the invention. In this embodiment the flywheel and ring gear assembly 78 is formed with a unitary generally resilient centering shaft portion 78a which receives the forward end of a stub shaft 80. This embodiment utilizes a cam and ball assembly 82 and 84 respectively at both ends of the housing member 86 with the outermost cam member 82a, 84a of each cam and ball assembly being secured to the respective end wall of the housing as by means of rivet members 86a. It will be seen, therefore, that no cam follower members such as correspond to members 40 and 58 of the first and second described embodiments are utilized in the instant arrangement. The inner cam member 82b and 84b of each cam assembly is coupled to the shaft 80 by coacting spline structure 87, 87a on the inner cam members and shaft, respectively, to thereby prevent relative rotary movement between the inner cams 82b, 84b and the shaft, while permitting lengthwise axial movement of the inner cam members with respect to the shaft. A compression spring member 88 is disposed intermediate inner cams 82b and 84b for resisting relative inward axial movement therebetween, and thus urging the inner cams 82b, 84b outwardly against their respective ball members 90 and associated outer cam members 82a, 84a.

It will be noted that in this embodiment the confronting faces of each of the cam members of each cam and ball assembly 82, 84, are generally flat or planar instead of being corrugated or waved as in the first described embodiment, and as can be best seen from FIG. 11 of the drawing. The cam slots or depressions 92 in each of cam members 82a, 82b or 84a, 84b are of elongated dished-like configuration but of a more or less teardrop shape as opposed to the generally symmetrical shape of the cam slots in the aforedescribed embodiments. In other words, one end 92a of each of these slots 92 is of a relatively narrow dimension in width and depth as compared to the other end of each of the cam slots, to thereby provide for the axial separation of the corresponding cam members 82a, 82b or 84a, 84b, of each cam and ball assembly upon relative rotative movement therebetween due to the driving of housing member 86, the latter transmitting the driving force from the engine through outer cam members 82a, 84a, then through the movable balls 90 to the respective inner cam members 82b, 84b, and thence to the stub shaft 80. It will be seen that during this driving movement the cam members 82a, 82b and 84a, 84b, of each cam and ball assembly, may move or rotate relative to one another and the inner cam members 82b, 84b, may then be moved inwardly toward one another and axially of shaft 80 against the resistance of spring 88, to effectively dampen torsional vibrations in the drive shaft 14.

FIGS. 12 and 13 illustrate a further embodiment of the invention somewhat similar to the FIGS. 10 and 11 embodiment except that a pair of compression spring members 96, 96a are utilized at opposite ends of the housing member 97. Furthermore, in this embodiment, the flywheel and ring gear assembly 78 is secured as for instance by welds 98 to the forward end of stub shaft 100 to thus couple the stub shaft directly to the flywheel. The housing member 97 is formed integrally with or attached directly to the drive shaft 14. The outer cam members 82a, 84a of each of the cam and ball assemblies 82, 84, is splined as at 87, 87a to shaft 100, and the inner cam members 82b, 84b of each cam and ball assembly are secured to one another as by means of rivets 102, and are coupled, as by means of such rivets, to a centrally apertured cup-shaped cam follower element 104 which in turn is secured as by means of fasteners 106 to housing 97. Thus power is transmitted from the engine crank shaft 22 to flywheel assembly 78, to shaft 100, then through outer cam members 82a, 84a to movable balls 90 of each of the cam and ball assemblies 82, and 84, and thus to the inner cam members 82b, 84b, thence to cam follower member 104, to housing member 97 and thence to the drive shaft 14. The cam slots 92 in each of the cam members 82a, 82b, 84a and 84b, are generally similar in configuration to the FIGS. 10 and 11 embodiment, thereby forcing the outer cam members 82a, 84a outwardly against the resistance to compression of the respective spring member 96, 96a, upon driving of the stub shaft 100 to drive the housing member 97 and attached drive shaft 14. Spring 96 abuts at its forward end against stop 108 attached as at 110 to the flywheel and ring gear assembly 78, while spring 96a at its rear end abuts against washer or stop 112 mounted on the rearward end of shaft 100. Seal 113 is provided to retain lubricant within housing member 97.

While in the drawings and in the automotive environment illustrated, the dampening device has been shown positioned adjacent the prime mover or motor 12 of the vehicle, it will be understood that it could be positioned in other locations in the drive system, as for instance adjacent the rearward end of the drive shaft.

From the foregoing description and accompanying drawings it will be seen that the invention provides a relatively economical, uncomplicated and effective torsional vibration dampening device which utilizes axially compressible resilient means in conjunction with axially and relatively rotatably movable cam means movably coupled to one another to transmit rotary movement from a rotatable driving member to a rotatable drive shaft for driving the latter, and wherein certain of the cam means is coupled to the driving member and other of the cam means is coupled to the drive shaft and in a manner whereby torsional oscillations in the drive shaft are prevented.

The terms and expressions which have been utilized are terms of description and not of limitation and there is no intention in the use of such terms and expressions of excluding any equivalents of any of the features shown or described or portions thereof, and it is recognized that various modifications are possible within the scope of the invention claimed.

I claim:

1. In a torsional vibration dampening device adapted to be disposed between a rotary driving member and a rotatable driven shaft member for coupling said members together in driving relation while dampening torsional vibrations in the shaft member, a hollow housing member adapted for connection at one end to said driving member and adapted at the other end to receive said shaft member therein in axially aligned relation, a first cam assembly disposed interiorly of said housing member at the forward end thereof, a second cam assembly disposed interiorly of said housing member at the rearward end thereof, each of said cam assemblies comprising an outer cam member secured to said housing member and an inner cam member adapted to be secured to said shaft member, the outer and inner cam members of each cam assembly being arranged for relative rotary movement therebetween, each of said outer and inner cam members including circumferentially spaced elongated cam slots therein, said slots in said cam members of each of said assemblies being disposed in confronting paired relation with a ball member movably disposed in each pair of said confronting slots, said ball member coacting in rolling engagement with the respective slots, to transfer the power from said driving member to said shaft member and to cause axial movement of the inner cam member away from the respective outer cam member, and resilient means disposed between said inner cam members to oppose said relative axial movement and relative rotary movement of said cam members of each cam assembly, said resilient means being operative to maintain said ball members in the respective slots in at least one rotary direction of said driving member.

2. In a torsional vibration dampening device in accordance with claim 1 wherein each of said cam members comprises a generally planar end surface thereon, said slots being of a generally teardrop dish-like configuration diminishing in both width and depth from one end of each of said slots to the other end thereof.

3. In a torsional dampening device adapted to be disposed between a rotatable driving member and a rotatable driven shaft member for coupling said members together in driving relation and to dampen torsional vibrations in the shaft member, a hollow housing member adapted for connection at one end to said shaft member and to extend forwardly toward said driving member, a stub shaft element adapted for connection at its forward end to said driving member for rotation therewith and extending rearwardly into the interior of said housing element, a pair of cam assemblies disposed in juxtaposed relation interiorly of said housing element, said cam assemblies being centrally apertured and receiving said stub shaft element therethrough, each of said cam assemblies comprising an outer cam member coupled to said stub shaft for positive rotation therewith while permitting lengthwise movement of said outer cam members on said stub shaft and an inner cam member secured to said housing member for positive rotation with said housing member, means securing said inner cam members together for rotation as a unit, the outer and inner cam members of each cam assembly comprising circumferentially spaced elongated cam slots therein, said slots in said cam members of each of said assemblies being disposed in confronting paired relation with a ball member movably disposed in each pair of said confronting slots, said cam members of each assembly being adapted for limited rotary movement therebetween and being operable to transfer the power from said driving member to said shaft member and to cause axial movement of the outer cam members away from the respective inner cam members, and resilient means coacting with each of said outer cam members to resist relative axial movement thereof and to resist relative rotary movement between the cam members of each cam assembly, said resilient means being operative to maintain said ball members in the respective slots in at least one rotary direction of said driving member.

4. In a torsional vibration dampening device adapted to be disposed between a rotary driving member and a rotatable driven member for coupling said members together in driving relation while dampening torsional vibrations in the driven member, a first cam assembly, a second cam assembly disposed axially from said first cam assembly, each of said cam assemblies comprising an outer cam and an inner cam member, means for coupling said outer cam of each cam assembly to the driving member for rotation therewith, means for coupling said inner cam of each cam assembly to the driven member for rotation therewith, said last mentioned means including means for operably coupling the inner cam members of the cam assemblies together for rotation as a unit, one of said cam members of each cam assembly being movable axially relative to the driving and driven members and in a direction away from the other cam member of the respective cam assembly, the outer and inner cam members of each cam assembly including circumferentially spaced elongated cam slots therein, said slots in said outer and inner cam members of each cam assembly being disposed in confronting paired relation with a ball member movably disposed in each pair of said confronting slots, each of said slots progressively diminishing in width and depth from one end of the respective slot to the other end thereof, said ball member coacting with the respective slots to cause said axial movement of said one cam member of each assembly upon driving of said driving member, while permitting relative rotative movement between said cam members of each assembly and resilient means to oppose said relative movement of said cam members, said resilient means being operable to maintain said ball members in their respective slots in both rotary directions of said driving member.

5. In a torsional vibration dampening device adapted to be disposed between a rotary driving member and a rotary driven member, for dampening torsional vibrations in said driven member while coupling said members together in driving relation, comprising first cam means, means for coupling said first cam means to the driving member for conjoint rotation therewith, second cam means generally axially juxtaposed with said first cam means, means providing for axial movement of one of said cam means with respect to the other of said cam means, each of said cam means including circumferentially and equally spaced, elongated cam slots therein, said slots in said cam means being disposed in generally confronting, paired relation, a ball movably disposed in each pair of said confronting slots, said balls permitting limited relative rotational movement between said cam means and coacting with and in the respective slots to cause said axial movement of said one of said cam means away from the other of said cam means during rotation of the driving member, means for connecting said second cam means to the driven member for conjoint rotation therewith, reaction means axially spaced from said cam means and adapted for securement to one of the members, and compressible resilient means disposed between said reaction means and said axially movable cam means, said resilient means having sufficient capacity to maintain said balls in their respective slots throughout the speed range of the members.

6. In a torsional vibration dampening device adapted to be disposed between a rotary driving member and a rotary driven shaft member, for coupling said members together in driving relation while dampening torsional vibrations in the driven member, comprising a hollow housing adapted to be coupled in axial alignment with one of said members for conjoint rotation therewith, first cam means disposed in axial alignment in said housing, means coupling said first cam means to said housing for rotation therewith, second cam means generally axially juxtaposed with said first cam means, means providing for axial movement of one of said cam means with respect to the other of said cam means and with respect to said housing, means for coupling said second cam means to the driven member for conjoint rotation therewith, each of said cam means including circumferentially and evenly spaced elongated slots therein, said slots in said cam means being disposed in generally confronting paired relation, a ball movably disposed in each pair of said confronting slots, said balls permitting limited relative rotational movement between said cam means, said slots having cam surfaces therein adapted for coaction with the respective ball so as to cause said axial movement of said one cam means with respect to said housing and away from the other of said cam means, during rotation of the driving member, reaction means in said housing axially spaced from said cam means and adapted to be secured to one of the members, and compressible resilient means disposed between said reaction means and said axially movable cam means, said resilient means being operative to maintain said balls in their respective slots throughout the rotary speed range of the driving and driven members.

7. In an automotive vehicle, the combination comprising a rotary driving member, a rotary driven shaft member, and a torsional vibration dampening device disposed between the driving member and the shaft member for coupling said members together in driving relation while dampening torsional vibrations in the driven member, said device comprising a hollow housing coupled to one of said members in axially aligned relation for conjoint rotation therewith, first cam means disposed interiorly of said housing, means coupling said first cam means to said housing for rotation therewith, second cam means generally axially juxtaposed with said first cam means, axially extending spline means providing for axial movement of one of said cam means with respect to the other of said cam means and said housing, means connecting said second cam means to the driven member for conjoint rotation therewith, each of said cam means including circumferentially and evenly spaced, elongated cam slots therein, said slots in said cam means being disposed in generally confronting paired relation, a ball movably disposed in each pair of said confronting slots, said balls permitting limited relative rotational movement between said cam means, said slots being so configured lengthwise thereof so as to cause said axial movement of said one cam means with respect to said housing and away from the other of said cam means, during relative rotational movement of said cam means due to rotation of said driving member, reaction means on said housing axially spaced from said cam means, said reaction means being stationarily disposed with respect to one of said members for rotation therewith, and a compression-type coiled spring disposed between the reaction means and said axially movable cam means, said spring being operative to maintain said balls in their respective slots throughout the rotary speed range of the driving and driven members.

8. The combination in accordance with claim 7 wherein the driving member includes a fly-wheel, a relatively flexible plate element adapted to be disposed in parallel relation with respect to the flywheel of said driving member and connected to said housing element, adjustable support means disposed coaxially on said flywheel for supporting the forward end of said shaft member therein, said plate element in conjunction with said adjustable support means accommodating a limited amount of misalignment between said driving member and said shaft member.

9. In a torsional vibration dampening device adapted to be disposed between a rotary driving member and a rotary driven member for coupling said members together in driving relation while dampening torsional vibrations in the driven member, first cam means, means for coupling said first cam means to said driving member for rotation therewith while permitting axial movement of said first cam means with respect to said members, second cam means axially juxtaposed with said first cam means, the confronting end surfaces of said cam means each having a circumferentially extending serrated-like configuration, said configurations being axially spaced from one another but disposed in generally meshing relation, the obliquely extending portion of each serration comprising an elongated slot therein of symmetrical dished-like configuration with respect to the plane of the respective obliquely extending portion, said slots in each of said cam means being equally spaced in a circumferential direction with respect to one another, said slots in said cam means being disposed in generally confronting paired relation, a ball movably disposed in each pair of said confronting slots, said balls permitting limited relative rotational movement between said cam means, the defining surfaces of said slots coacting with the respective ball to cause said axial movement of said first cam means and away from the other of said cam means during relative rotational movement of said cam means due to rotation of the driving member, the axially extending end portions of the serrated configurations of said cam means being disposed in circumferentially spaced confronting relation, reaction means axially spaced from said cam means and adapted to be secured to one of the members, resilient compressible means disposed between the reaction means and said first cam means, said resilient means being operative to maintain said balls in the respective slots throughout the rotary speed range of the driving and driven members in one rotary direction, said axially extending end portions of said serrated configurations being adapted for abutting engagement upon predetermined relative rotary movement between said cam means in the opposite rotary direction due to rotary movement of the driving member in the corresponding rotary direction.

10. In a torsional vibration dampening device adapted to be disposed between a rotary driving member and a rotary driven shaft member for coupling said members together in driving relation while dampening torsional vibrations in the driven member comprising, an elongated hollow housing adapted to be coupled in axial alignment to said driving member and adapted to receive the shaft member interiorly thereof in lengthwise extending axially aligned relation, first axially apertured cam means disposed interiorly of said housing in axially aligned relation therewith and including means coupling said first cam means to said housing for conjoint rotation therewith while permitting lengthwise movement of said first cam means with respect to said housing, axially apertured second cam means disposed in generally axially juxtaposed relation to said first cam means interiorly of said housing, means for coupling said second cam means to the driven member for conjoint rotation therewith, the confronting end surfaces of said cam means each being of a circumferentially extending serrated-like configuration, said serrated-like configurations being disposed in axially spaced but generally meshing relation, the obliquely extending portion of each serration comprising an elongated slot therein of symmetrical dished-like configuration with respect to the plane of the respective obliquely extending portion, said slots being disposed in equally spaced relation with respect to one another in a circumferential direction, said slots in said cam means being disposed in confronting paired relation, a ball movably disposed in each pair of said confronting slots, said balls permitting limited relative rotational movement between said cam means and being adapted to coact with the dished configuration of the respective slots during such relative rotational movement to cause said axial movement of said first cam means with respect to said housing and away from the other of said cam means during rotation of the driving member, the axially extending end portions of the serrated configurations of said cam means being disposed in circumferentially spaced confronting relation, said housing including reaction means axially spaced from said cam means, compressible resilient means disposed between said reaction means and said first axially movable cam means, said resilient means being operative to maintain said balls in their respective slots throughout the rotary speed range of the driving and driven members in one rotary direction, said axially extending end portions of said serrated configurations being adapted for engagement upon predetermined relative rotary movement between said cam means in the opposite rotary direction due to rotation of said driving member in the corresponding rotary direction, to stop relative rotational movement between said cam means.

11. In a torsional vibration dampening device adapted to be disposed between a forward rotatable driving member and a rearward rotatable driven shaft member for coupling said members together in driving relation while dampening torsional vibrations in the shaft member comprising, a tubular housing, means on the forward end of said housing for securing the same to the driving member in coaxial relation therewith, said housing having rearward abutment means thereon, said housing being adapted to receive the shaft member therein in coaxial extending relation, a centrally apertured, circular, first cam member disposed interiorly of said housing in coaxial relation therewith and being adapted to receive the shaft member through the aperture in said cam member for mounting the latter on the shaft, cup shaped means for securing said cam member to said housing for positive rotation of said cam member with said housing while permitting axial movement of said cam member with respect to said housing, a second, circular and centrally apertured cam member disposed in said housing in coaxial relation therewith, the shaft member being adapted to project through the aperture in said second cam member for mounting the latter on the shaft member, means for coupling said second cam member to the shaft for positive rotation therewith, said cam members being disposed in generally juxtaposed relation, the confronting end surfaces of said cam members each having a circumferentially extending serrated-like configuration, the obliquely extending portion of each serration comprising an elongated dished-like slot therein formed symmetrically with respect to the plane of the respective obliquely extending portion, said slots in each cam member being equally spaced from one another in a circumferential direction, said slots in said cam members being disposed in generally confronting paired relation, a ball movably disposed in each pair of said confronting slots and axially spacing said serrated-like configurations from one another but providing a generally meshing relation between said configurations, said balls permitting limited relative rotational movement between said cam members and being adapted for coaction with the dished configurations of the respective slots to cause said axial movement of said first cam member away from the other of said cam members during rotation of the driving member, the axially extending end portions of the serrated configurations of said cam members being disposed in circumferentially spaced confronting relation, resilient compression means extending rearwardly from said cup shaped means and being disposed between the latter and said rearward abutment means of said housing, said resilient means being operative to maintain said balls in their respective slots throughout the rotary speed range of the driving and driven members in one rotary direction, said axially extending end portions of said serrated configurations of said cam members being adapted for engagement upon predetermined relative rotary movement between said cam members in the opposite rotary direction due to corresponding rotation of said driving and driven members, to stop relative rotational movement between said cam members.

12. In a torsional vibration dampening device adapted to be disposed between a forward rotatable driving member and a rearward rotatable driven shaft member, for coupling said members together in driving relation while dampening torsional vibrations in the shaft member comprising, a tubular housing, means on the forward end of said housing for securing the same to the driving member in coaxial relation therewith, said housing including forward abutment means thereon, said housing being adapted to receive the shaft member therein in coaxial extending relation, a centrally apertured, circular, first cam member disposed interiorly of said housing in coaxial relation therewith and being adapted to receive the shaft through the aperture in said cam member for mounting the latter on the shaft, cup-shaped means securing said cam member to said housing for positive rotation of said cam member with said housing while permitting axial movement of said cam member with respect to said housing, a second circular centrally apertured cam member disposed in said housing in coaxial relation therewith and rearwardly of said first cam member, the shaft member being adapted to project through the aperture in said second cam member for mounting the latter on the shaft, means for coupling said second cam member to the shaft for positive rotation therewith, said cam members being disposed in generally juxtaposed relation, the confronting end surfaces of said cam members each having a circumferentially extending serrated-like configuration, the obliquely extending portion of each serration comprising an elongated dished-like slot therein, said slots being formed symmetrically with respect to the surface of the respective obliquely extending portion and being equally spaced from one another in a circumferential direction, said slots in said cam members being disposed in generally confronting paired relation, a ball movably disposed in each pair of said confronting slots and axially spacing said serrated-like configurations from one another but providing a generally meshing relation between said configurations, said balls permitting limited relative rotational movement between said cam members and being adapted for coaction with the dished configurations of the respective slots to cause said axial movement of said first cam member away from the other of said cam members during rotation of the driving member, the axially extending end portions of the serrated configurations of said cam members being disposed in circumferentially spaced confronting relation, resilient compressible means disposed forwardly of said cam members and between said cup-shaped means and said forward abutment means on said housing, said resilient means being operative to maintain said balls in their respective slots throughout the rotary speed range of said driving and driven members in one rotary direction, said axially extending end portions of the serrated configurations being adapted for engagement upon predetermined relative rotary movement between said cam members in the opposite rotary direction due to corresponding rotation of said driving and driven members, to stop relative rotational movement between said cam members.

13. A device in accordance with claim 10 wherein said first and second cam means are disposed adjacent one end of said housing, and thrust bearing means disposed between the last mentioned cam means and said one end of said housing for resisting the force of said resilient means.

(References on following page)

References Cited in the file of this patent

UNITED STATES PATENTS

| | | |
|---|---|---|
| 2,123,008 | Hayes | July 5, 1938 |
| 2,209,155 | Fagg | July 23, 1940 |
| 2,617,949 | Leland | Nov. 11, 1952 |

FOREIGN PATENTS

| | | |
|---|---|---|
| 329,436 | Great Britain | May 22, 1930 |
| 361,187 | Great Britain | Nov. 19, 1939 |
| 467,563 | Canada | Aug. 22, 1950 |
| 1,023,579 | France | Dec. 30, 1952 |